US012080320B2

(12) United States Patent
Khaleghimeybodi et al.

(10) Patent No.: US 12,080,320 B2
(45) Date of Patent: Sep. 3, 2024

(54) SYSTEM FOR NON-VERBAL HANDS-FREE USER INPUT

(71) Applicant: Meta Platforms Technologies, LLC, Menlo Park, CA (US)

(72) Inventors: Morteza Khaleghimeybodi, Bothell, WA (US); Andrew Lovitt, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 95 days.

(21) Appl. No.: 17/248,243

(22) Filed: Jan. 15, 2021

(65) Prior Publication Data

US 2022/0230659 A1 Jul. 21, 2022

(51) Int. Cl.

| | |
|---|---|
| ***G10L 25/93*** | (2013.01) |
| ***G10L 25/03*** | (2013.01) |
| ***H04R 1/10*** | (2006.01) |
| ***H04R 1/46*** | (2006.01) |

(52) U.S. Cl.

CPC .............. *G10L 25/93* (2013.01); *G10L 25/03* (2013.01); *H04R 1/1016* (2013.01); *H04R 1/46* (2013.01)

(58) Field of Classification Search

CPC ...... H04R 25/00; H04R 25/60; H04R 25/607; H04R 25/656; H04R 2460/13; H04R 1/1016; H04R 1/10; H04R 1/46; H04R 1/1041; H04R 1/1083; H04R 1/028; H04R 2410/05; H04R 2420/07; H04R 1/02; H04R 29/001; H04R 29/00; H04R 2400/03; H04R 2430/01; G10L 25/93; G10L 25/03; G10L 15/22; G10L 15/00; G06F 1/163;

(Continued)

(56) References Cited

U.S. PATENT DOCUMENTS 10,708,706 B1 7/2020 Brimijoin, II et al.
10,791,389 B1 9/2020 Khaleghimeybodi et al.

(Continued)

FOREIGN PATENT DOCUMENTS

CN 103293673 A * 9/2013
CN 103336580 A * 10/2013

(Continued)

OTHER PUBLICATIONS

International Search Report and Written Opinion for International Application No. PCT/US2022/011774, mailed May 13, 2022, 13 pages.

(Continued)

*Primary Examiner* — Leshui Zhang

(74) *Attorney, Agent, or Firm* — McDermott Will & Emery LLP

(57) ABSTRACT

An electronic system is described that is responsive to non-verbal commands. The system may include a display component for presenting visual content to a user and an audio system, such as an in-ear or over-the-ear speaker system. The speaker system may be equipped with a bone conduction sensor or in-ear microphone that generates data associated with vibrations of a facial region of the user. The system may use the data to detect non-verbal command in the form of grunts, hums, coughs, tongue clicks, and the like. The system may perform various predetermined operations based on the detected vibrations.

20 Claims, 8 Drawing Sheets

(58) Field of Classification Search

CPC .......... G06F 1/16; G06F 1/1613; G06F 3/167; G06F 3/011; G06F 3/165; G06F 3/013; G06F 3/017; G06F 3/016; G06F 3/04815; G06F 3/012; G06F 3/014; H04M 1/03; G06T 19/006; G02B 27/017; G02B 27/0172; H04S 7/304

USPC ....... 704/200, 201, 214, 216, 223, 226, 231, 704/232, 233, 246, 271, 272; 381/151, 381/56, 57, 58, 60, 23.1, 312–331, 73.1, 381/74

See application file for complete search history.

(56) References Cited

U.S. PATENT DOCUMENTS

2001/0024507 A1* 9/2001 Boesen ............... H04M 1/6066 381/315
2010/0110368 A1* 5/2010 Chaum .................. G02C 11/10 351/158
2013/0083940 A1* 4/2013 Hwang ................ H04R 1/1041 381/74
2014/0009739 A1* 1/2014 Greco .................... A61B 3/113 351/206
2019/0214038 A1* 7/2019 Bouserhal ............... G10L 25/84
2020/0184996 A1* 6/2020 Steele .................. H04R 1/1083

FOREIGN PATENT DOCUMENTS

CN 103336580 B 10/2013
JP 2016197305 A * 11/2016

OTHER PUBLICATIONS

International Preliminary Report on Patentability for International Application No. PCT/US2022/011774, mailed Jul. 27, 2023, 12 pages.

* cited by examiner

SYSTEM FOR NON-VERBAL HANDS-FREE USER INPUT

BACKGROUND

Hands-free electronic devices are becoming more and more prevalent. These hands-free electronic devices are often controlled using voice or audio input. However, voice inputs may be problematic when the user is engaged in a conversation or has an open audio communication channel with other users.

SUMMARY

An electronic system is described herein. The electronic system may be configured to identify non-verbal audio-based user inputs or commands. For example, the electronic system may be configured to detect user inputs in the form of tongue or teeth clicks, coughs, grunts, hums, and other non-verbal sounds generated by the user. In some cases, the non-verbal commands may also include actions such as the user tapping, rubbing, or otherwise touching their facial region with, for instance, their hand. These non-verbal commands may be used to supplement, augment, and/or replace traditional verbal or spoken word commands, such as when the user is actively engaged in conversation through the electronic system.

In some example implementations, the electronic system may comprise one or more earbuds (such as a left and right earbud) configured with one or more speakers to output sound to a user. The earbuds may also be equipped with one or more bone conduction sensors configured to detect and capture vibrations propagated through the facial bones of the user. The earbuds may also comprise one or more acoustic microphones, a contact microphone, an inertial measurement unit (IMU), and/or other device for detecting bone conducted vibrations. The bone conduction sensor may be positioned in contact with the ear of user, such as within the ear canal, to improve detection of the non-verbal commands. Alternatively, the bone conduction sensor may be positioned inside the earbud and not in direct contact with the ear of the user.

The electronic system may be configured to allow the user to initialize the non-verbal commands during a configuration process or period. For example, the electronic system may be configured to capture bone conduction data as the user generates the non-verbal vibration (e.g., a noise) associated with the user input. The user may then designate, such as via a user interface, a command or action for the electronic device to associate with the non-verbal noise. In this case, once the non-verbal command is initialized, the electronic system may detect the non-verbal noise within bone conduction data by the bone conduction sensor during subsequent operations. In some cases, the electronic system may compare a waveform isolated and recorded during the configuration period with incoming bone conduction data to determine a match within predefined thresholds. The system may then perform the associated action in response to detecting the match.

In some examples, the earbuds may also include one or more external microphones that may be configured to capture noise or environmental audio data in the surrounding physical environment. In these examples, the electronic system may be configured to isolate the bone conduction data from the environmental audio data and the known output of the speaker. In this way, the environmental audio data is prevented from affecting commands that the user provides that are sensed via bone conduction.

In some implementations, the electronic system may also include a wearable visual display, such as a virtual reality or mixed reality headset. The headset may be configured to perform eye-tracking that is capable of determining a region or object of interest based on the gaze of the user with respect to the displayed or virtual scene. In these implementations, the electronic system may be configured to utilize the gaze of the user in combination with a detection of the non-verbal noise as a combined user input. For example, the gaze of the user in relation to the display may represent or define a target for the action associated with the non-verbal command.

Figure 1:
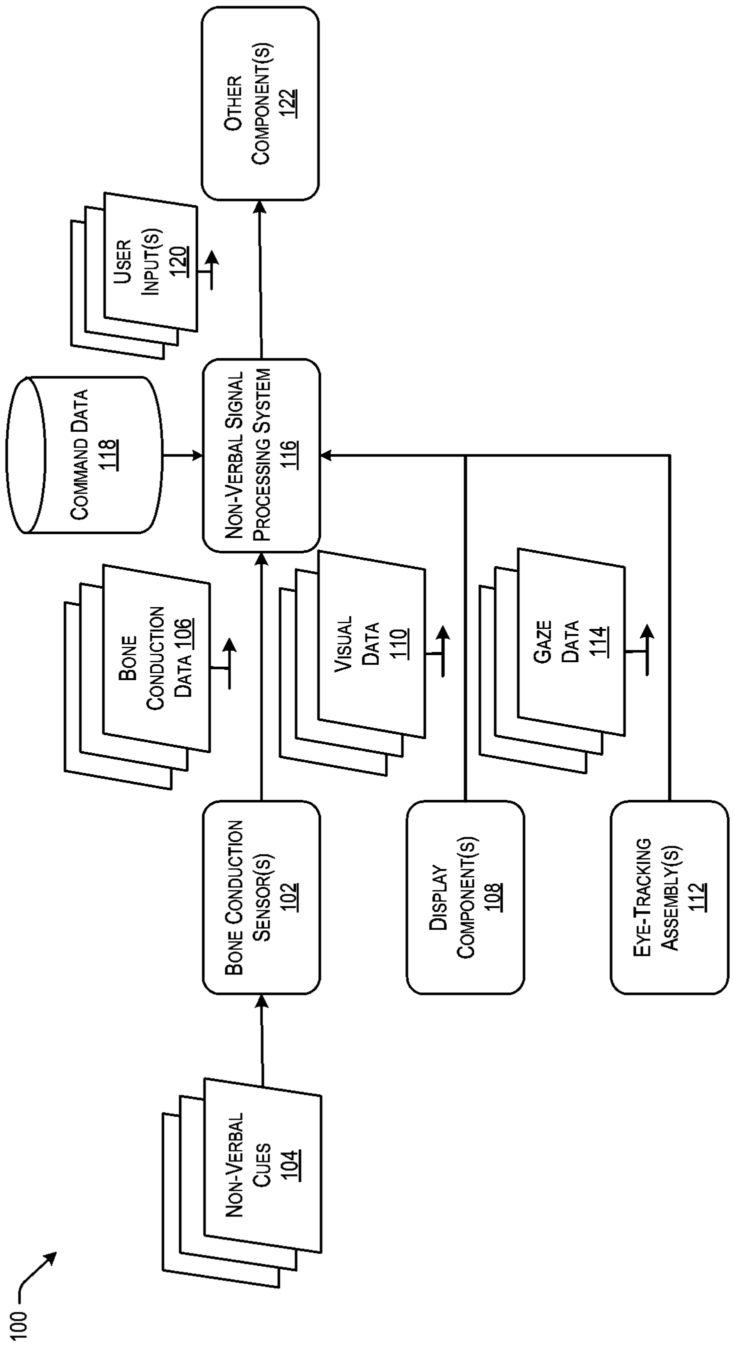
FIG. 1 is a block diagram of an example system configured to receive non-verbal commands, in accordance with one or more examples.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

As discussed above, many electronic devices are implementing hands-free controls, such as natural language processing that responds to verbal commands. However, in some circumstances and situations, such as when a user is actively engaged in conversation, verbal commands or other audio-based user inputs may be problematic. For example, the spoken verbal commands may disrupt the flow of conversation and/or allow the other participants of the conversation to overhear the voice commands. As such, the system discussed herein may be configured to initialize, detect, and respond to non-verbal commands of the user.

In some implementations, the electronic system, discussed herein, may comprise one or more earbuds (such as a left and right earbud) configured with one or more speakers to output sound to a user. The earbuds may also be equipped with one or more bone conduction sensors (e.g., a single bone conduction sensor in one earbud of the pair of earbuds, and/or a bone conduction sensor in each of the earbuds). In some cases, the bone conduction sensor may comprise one or more bone conduction and/or air conduction sensors or microphones to, respectively, monitor and capture the non-verbally-driven tissue vibrations or sounds. For instance, the bone conduction sensor may be configured to detect and capture vibrations propagated through the facial bones and features of the user. In this manner, the user may generate detectable vibrations or noises without speaking or uttering verbal commands. For instance, the non-verbal commands may be in the form of tongue or teeth clicks, coughs, grunts, hums, and the like, as well as actions that cause a vibration within the facial structures of the user, such as the tapping, rubbing, or otherwise touching of the facial regions (e.g., rubbing a cheek or scratching a head).

As used herein, the bone conduction sensor may comprise one or more of an in-ear microphone, a contact microphone, an inertial measurement unit (IMU), accelerometer, and/or other device for detecting vibrations. The bone conduction sensor may be positioned in contact with the ear of the user to improve detection of the non-verbal commands.

In some implementations, the system may also include a headset or wearable visual display (e.g., head-mounted display (HMD) and/or near-eye display (NED)) that may present virtual reality (VR) content, augmented reality (AR) content, mixed reality (MR) content, hybrid reality content, or some combination and/or derivatives thereof. The headset may be configured to perform eye-tracking or gaze detection to determine a region or object of interest based on the gaze of the user with respect to the displayed or a presented scene. In these implementations, the system may be configured to utilize the gaze of the user in combination with a detection of the non-verbal noise as a combined user input. For example, the gaze of the user in relation to the display may represent or define a target for an action associated with the non-verbal command.

As discussed above, the user may be capable of initializing or otherwise defining the non-verbal commands during a configuration process or period. For example, the bone conduction sensor may capture vibrational data as the user generates the vibrations (e.g., clicks their tongue teeth, taps their cheek, or the like) associated with the user input. The user may then designate, such as via a user interface, a response or action for the system perform in response to future detection of the non-verbal command. The actions or operations that a user may associate with non-verbal commands may comprise a click or selection (e.g., commands traditionally associated with clicking a left mouse button or a right mouse button), a double click, scrolling up, down, left, or right, and the like. In some cases, the action or operations may be defined for specific application or software, such that the non-verbal command performs an action specific to the active application or software. In some specific examples, if the vibrational data represents vibrations that do not correspond to a stored non-verbal command, the system may utilize the vibrational data to provide additional cancelation, such as with respect to data generated by the in-ear microphone.

In some implementations, the earbuds may also include one or more external microphones that may be configured to capture noise or environmental audio data in the surrounding physical environment. In these implementations, the electronic system may be configured to isolate the bone conduction data or vibrations from the environmental audio data and the audio output of the speaker.

As discussed above, examples of the present system may include or be implemented in conjunction with an artificial reality system. Artificial reality is a form of reality that has been adjusted in some manner before presentation to a user. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, such as a headset connected to a host computer system, a standalone headset, a mobile device or electronic device or system, or any other hardware platform capable of providing artificial reality content to one or more viewers.

FIG. 1 is a block diagram of an example system 100 configured to receive to non-verbal commands, in accordance with one or more examples. As discussed herein, the system 100 may include one or more earbuds, over-the-ear, or in-ear speaker devices for providing audio output to a user as well as a headset (such as, a HMD, NED, or other headset as discussed above) for presenting visual content (such as VR content, AR content, MR content, and the like) to the user. The earbuds may include a speaker to output audio signals as sound to the user and a bone conduction sensor 102 for monitoring and capturing non-verbal cues 104. For example, the non-verbal cues 104 may include non-verbally driven tissue vibrations or sounds present in the ear canal or associated with a facial structure of the user. The bone conduction sensor 102 may, in some instances, capture and convert the cues 104 into bone conduction data 106 (e.g., one or more waveforms representative of the vibrations over time) usable by the system 100 to identify non-verbal user inputs.

The headset may be equipped with display components 108 for presenting the visual data 110 or content to the user. The headset may also comprise an eye-tracking assembly 112 to generate gaze data 114 representative of the gaze, target region, and/or target object of the user's attention. In the current example, a non-verbal signal processing system 116 may be configured to determine the gaze, target region, and/or target object based on the gaze data 114 with respect to the visual data 110 provided by the display components 106. For instance, the non-verbal signal processing system 116 may determine a region or portion of the display associated with the gaze of the user based on the gaze data 115 and then, based on the region or portion, determine the object of interest based on the visual data 110.

As an illustrative example, the user may be engaged with the system 100 utilizing both the earbuds and the headset to consume and/or interact with visual and audio content. The user may be communicatively coupled with one or more other users, such that the other users may converse with the user. In this example, the user may desire to initiate an action or operation without alerting the other users (e.g., without speaking the command). As such, the user may click or tap their tongue against the side or roof of their mouth to trigger a first command or user input.

In some cases, the non-verbal cues 104 may be used as a wake word or activation trigger for the system 100. For example, the system 100 may be configured to listen for a specific non-verbal command and to initiate other functions, processes, or components in response to detecting the specific non-verbal command. For example, the system 100 may turn on a camera, record a video, capture audio data, and the like in response to detecting the specific non-verbal command.

In this example, the bone conduction sensor 102 may generate bone conduction data 106 associated with the tongue click or tap. The bone conduction sensor 102 may provide the bone conduction data 106 to the non-verbal signal processing system 116. The non-verbal signal processing system 116 may compare the incoming bone conduction data 106 with stored command data 118 to determine a match. For instance, the non-verbal signal processing system 116 may determine a match between a waveform represented by the bone conduction data 106 and a stored waveform of a previously configured command when the waveforms are within one or more thresholds of each other (e.g., by comparing one or more peaks and/or troughs to a peak or trough threshold). In some cases, the non-verbal signal processing system 116 may detect a match based on a matched filter technique, applying one or more Short-Time Fourier Transforms, frequency analysis technique, template matching technique, use of one or more neural networks or other machine learned technique to perform extraction, segmentation, and classification. In some implementations, the system may also include predetermined commands (e.g., defined by the system) stored in the command data 118 along with the commands that the user generates or creates.

In addition to receiving the bone conduction data 106, the non-verbal signal processing system 116 may also receive visual data 110 from the display components 108 and/or gaze data 114 from the eye-tracking devices 112. In some cases, the bone conduction data 106, the visual data 110, and/or the gaze data 114 may be timestamped via a shared clock such that the non-verbal signal processing system 116 may temporally correlate the data 106, 110, and 114 received from the different devices and components. Upon detection of a match, as discussed above, the non-verbal signal processing system 116 may determine an object or target for the detected non-verbal command. For example, the non-verbal signal processing system 116 may determine a region of the display associated with the gaze of the user based on the gaze data 114. The non-verbal signal processing system 116 may also determine an object or other target of the user's gaze based on the region of the display and the visual data 110. As an example, the user may be looking at a virtual object displayed as part of the scene to the user via the display components to indicate that the object is the target for the operations associated with the non-verbal command.

The non-verbal signal processing system 116 may generate a user input 120 based on the object of interest and the operations associated with the detected non-verbal command. For instance, the non-verbal signal processing system 116 may generate a user input 120 corresponding to a selection of the object in response to detecting the non-verbal command. The non-verbal signal processing system 116 may then send the user input 120 to one or more other components 122 of the system 100 to perform the associated operations, such as a right click on the object, left click on the object, and the like.

Figure 2:
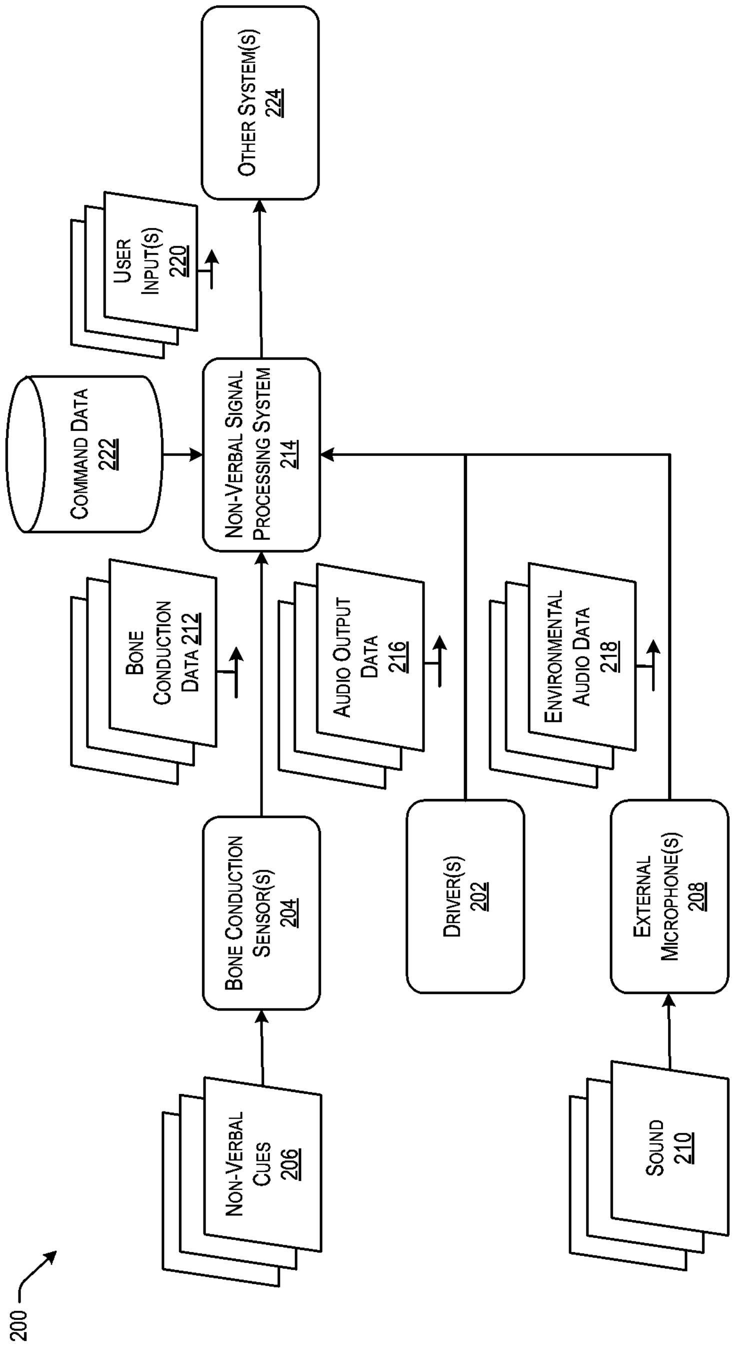
FIG. 2 is another block diagram of an example system configured to receive non-verbal commands, in accordance with one or more examples.

FIG. 2 is another block diagram of an example system 200 configured to receive to non-verbal commands, in accordance with one or more examples. Similar to the system 100 of FIG. 1, in the current example, the system 200 may include one or more earbuds, over-the-ear, or in-ear speaker devices for providing audio output to a user as well as a headset (such as, a HMD, NED, or other headset as discussed above) for presenting visual content (such as VR content, AR content, MR content, and the like) to the user. The earbuds may include a driver 202 to output audio signals as sound to the user and a bone conduction sensor 204 for monitoring and capturing non-verbal cues 206 associated with the user's facial region.

In the current example, the earbud may also include an external microphone 208 that may be configured to capture sound 210 associated with the surrounding environment, for instance, to apply noise cancelation and the like. In this example, the bone conduction sensor 204 may detect or capture bone conduction data 212 associated with the tongue click or tap, as discussed above. The bone conduction sensor 212 may provide the bone conduction data 212 to a non-verbal signal processing system 214. In this example, the driver 202 may also provide the audio output data 216 (e.g., the audio signal being output by the driver 202) and the external microphone 208 may provide environmental audio data 218 (e.g., the audio signal representative of the environmental noise) to the non-verbal signal processing system 214.

The non-verbal signal processing system 214 may process or denoise the bone conduction data 212 based at least in part on the audio output data 216 and/or the environmental audio data 218 to remove or isolate the signal for the tongue click or non-verbal command from other noise in the bone conduction data 212. The non-verbal signal processing system 214 may then determine a user input 220 based on stored command data 222 and the denoised bone conduction data 212. As discussed above, the non-verbal signal processing system 214 may also utilize gaze data and/or visual data to assist with determining a target for the user input 220. The non-verbal signal processing system 214 may then send the user input 220 to one or more other components 224 of the system 200 to perform the associated operations.

As discussed above example systems 100 and 200 are illustrated with respect to FIGS. 1 and 2. It should be understood that the various features and components of FIGS. 1 and 2 may be used in a single implementation. For instance, a system may include the bone conduction sensor 102 or 204, the display component 108, the eye-tracking assembly 112, the drivers 202, and the external microphone 208. Thus, it should be understood, that the implementations of FIGS. 1 and 2 are merely example systems and not intended to limit the features of any particular implementation. Additionally, it should be understood that the bone conduction sensors 102 and 204 may comprise multiple physically distinct components, such as a contact microphone and an in-ear microphone.

In the examples of FIGS. 1 and 2, the non-verbal signal processing systems 116 and 214 are illustrated as on system processes and components. However, it should be understood that some or all of the processing associated with detecting a non-verbal command may be performed on device, by one or more cloud-based services, or a combination thereof.

Figure 3:
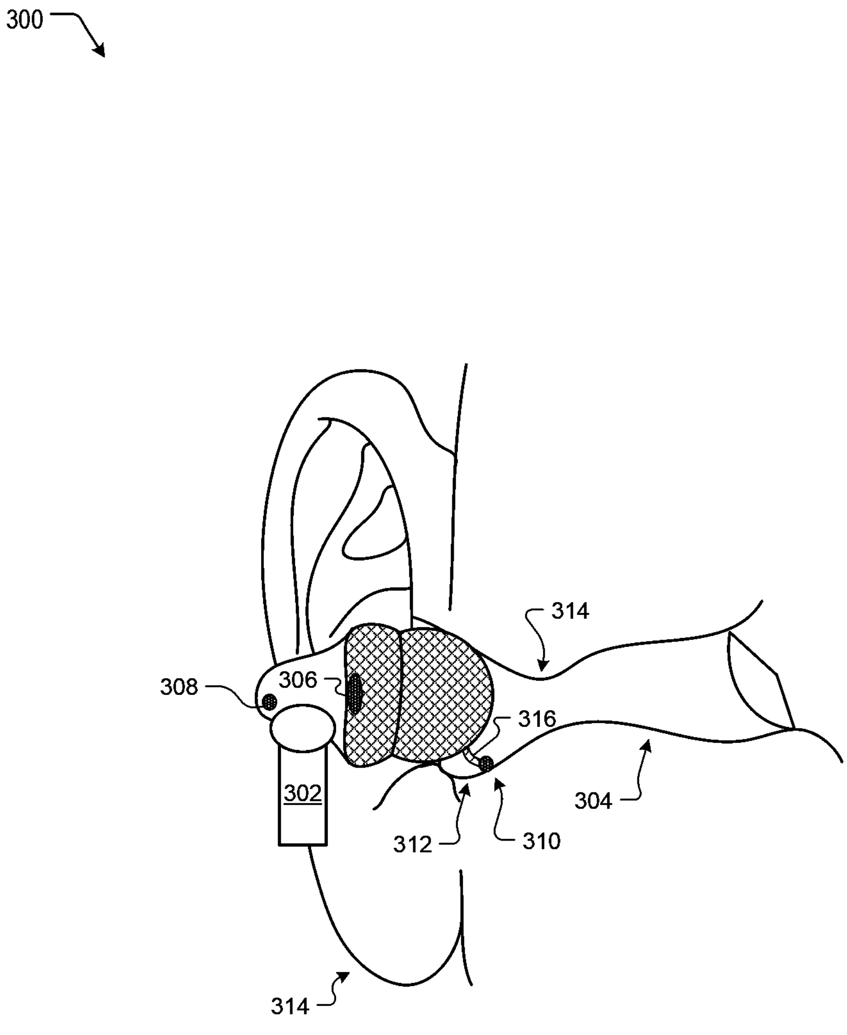
FIG. 3 is a perspective view of an example audio device, implemented as an earbud, configured to detect non-verbal commands, in accordance with one or more examples.

FIG. 3 is a perspective view 300 of an example audio device, implemented as an earbud 302, configured to detect non-verbal commands, in accordance with one or more examples. In the current example, the earbud 302 is in use and placed within an ear canal 304 of a user of the system configured to implement non-verbal commands. As discussed above, the earbud 302 may be equipped with a driver 306 for outputting an audio signal as sound into the ear canal 304, an external (e.g., environmental facing) microphone 308 for capturing environmental noise, and a bone conduction sensor 310 for capturing vibrations associated with the facial structure of the user.

In the current example, the bone conduction sensor 310 is positioned between a first bend 312 and a second bend 314 of the ear canal 304 to improve the overall signal quality captured and generated by the bone conduction sensor 310. For instance, as illustrated, the bone conduction sensor 310 may be positioned along an arm 316 extending outward from the earbud 302 to cause the bone conduction sensor 310 to press or otherwise contact a surface of the ear canal 304 during use. As discussed above, the bone conduction sensor 310 may comprise one or more in-ear microphones, one or more contact microphones, one or more IMUS, one or more accelerometers, one or more other devices for detecting vibrations, and/or a combination thereof. In some examples, the external microphone 308 and/or the bone conduction sensor 310 may comprise a microphone array, one or more directional microphones, one or more omnidirectional microphones, and the like. The bone conduction sensor may be positioned in contact with the ear of the user between a first bend and a second bend of the ear canal to improve detection of the non-verbal commands. In some examples, the earbud 304 may comprise both an in-ear microphone and one or more of a contact microphone, IMU, or accelerometer. For example, the in-ear microphone may be positioned along an interior (e.g., ear canal facing) surface of the earbud 302 and a contact microphone may be positioned on the arm 316 in contact with the surface of the ear canal 304.

As discussed herein, the external microphone 308, the driver 306, and the bone conduction sensor 310 may, respectively, send or provide environmental audio data, audio output data, and bone conduction data to a non-verbal signal processing system to detect and respond to user commands in the form of non-verbal noise.

It should be understood, that FIG. 3 is one example system, the number and/or locations of external microphone 308, the driver 306, the bone conduction sensor 310, and the arm 316 may be different from what is shown. For example, the number and/or locations of microphones and/or bone conduction sensors 310 may be increased to increase the amount of audio data and bone conduction data collected, the sensitivity of the microphones and/or bone conduction sensors, and/or accuracy of the information collected by the microphones and/or bone conduction sensors. Additionally, in some examples, the arm 316 may be removed such that the bone conduction sensor 310 is positioned along the body of the earbud 302.

It should also be understood that, while FIG. 3 depicts an earbud in a wireless communication with a system that the earbud may be in wired or wireless communication with other component of the system and/or one or more cloud-based service or processing resource.

Figure 4:
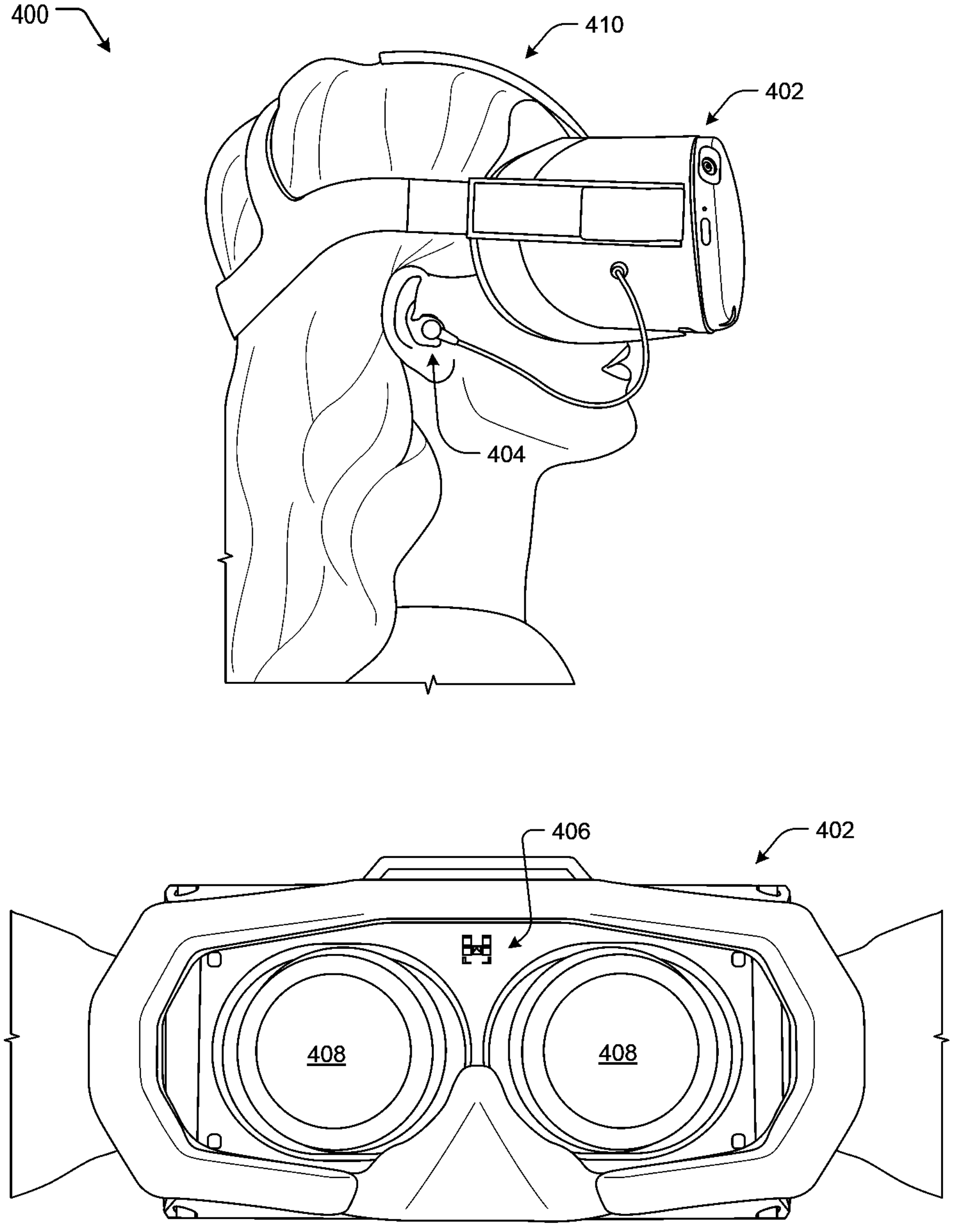
FIG. 4 is a perspective view of an example system, implemented as a headset, that includes an audio system configured to detect non-verbal commands with respect to a gaze of the user, in accordance with one or more examples.

FIG. 4 is a perspective view 400 of an example system, implemented as a headset 402, that includes an audio system configured to detect non-verbal commands with respect to a gaze of the user, in accordance with one or more examples. In some examples, the headset 402 is a NED. In general, the headset 402 may be worn on the face of a user such that visual content is presented using display components 408 and/or an audio system, such as the earbud 404. Examples are also considered in which the headset 402 presents visual content to a user 410 in a different manner. Examples of visual content presented by the headset 402 may comprise one or more images, video, audio, or some combination thereof. Examples of an electronic display components include, but are not limited to, a liquid crystal display (LCD), an organic light emitting diode (OLED) display, an active-matrix organic light-emitting diode display (AMOLED), a waveguide display, or some combination of these display types.

The headset 402 comprises a frame, and may include, among other components, the display assemblies including the display components 408. The frame may also support eye-tracking devices 406 including one or more cameras, infrared image devices, depth camera assemblies (DCA), and the like. The eye-tracking devices 406 may also comprise one or more illuminators, such as an infrared illuminator. In some examples, the illuminator may illuminate a portion of the local area with light. The light may be, for instance, structured light (e.g., dot pattern, bars, etc.) in the infrared, infrared flash for time-of-flight, and so forth. In some examples, the one or more eye-tracking devices 406 capture images of the portion of the local area that include the light from the illuminator. The eye-tracking devices 406 may then determine gaze data associated with the eyes of the user 410 based on, for instance, reflections between the cornea and pupils illuminated by the infrared illumination. The eye-tracking devices 406 may then provide the gaze data to the non-verbal signal processing system and the display components 408 may provide visual data to the non-verbal signal processing system.

As discussed above, the headset 402 may be coupled (e.g., directly as shown or alternatively via a wireless communication channel) to an earbud 404. The earbud 404 may provide bone conduction data and external audio data to a non-verbal signal processing system of the headset 402. The non-verbal signal processing system may then detect non-verbal commands based at least in part on the bone conduction data, the external audio data, the audio output data, the visual data, and the gaze data.

While FIG. 4 illustrates the components of the headset 402 in example locations on the headset 402, the components may be located elsewhere on the headset 402, on a peripheral device paired with the headset 402, or some combination thereof. Similarly, there may be more or fewer components on the headset 402 than what is shown in FIG. 4. Additionally, it should be understood that the frame of the headset 402 may hold the other components. In some examples, the frame includes a front portion that holds the one or more display components 408, and end pieces (e.g., temples) to attach the headset 100 to a head of the user. In some cases, the front portion of the frame 102 bridges the top of a nose of the user. The length of the end pieces may be adjustable (e.g., adjustable temple length) to fit different users. The end pieces may also include a portion that curls behind the ear of the user.

Figure 5:
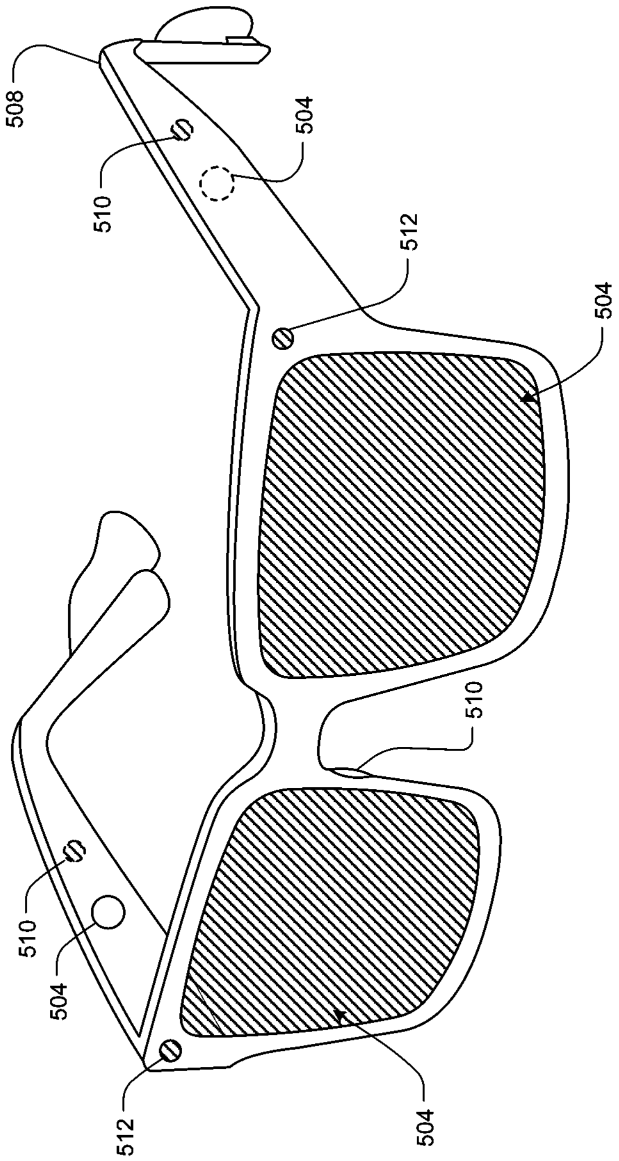
FIG. 5 is a perspective view of another example system, implemented as glasses, that includes an audio system configured to detect non-verbal commands with respect to a gaze of the user, in accordance with one or more examples.

FIG. 5 is a perspective view of another example system 500, implemented as glasses 502, that includes an audio system configured to detect non-verbal commands with respect to a gaze of the user, in accordance with one or more examples. Similar to the headset 402 discussed above with respect to FIG. 4, the glasses 502 may be worn on the face of a user such that visual content is presented using display components 504 and/or an audio system, such as the speakers 504. The glasses 52 may also comprises a frame 508, and may include, among other components, the display assemblies including the display components 504. The frame 508 may also support eye-tracking devices (not shown) including one or more cameras, infrared image devices, depth camera assemblies (DCA), and the like. As discussed above, the eye-tracking devices may determine gaze data associated with the eyes of the user based on, for instance, reflections between the cornea and pupils illuminated by the infrared illumination.

The frame 508 of the glasses may also include one or more bone conduction devices 510, such as microphones, contact microphones, accelerometers, IMUs and the like, and external microphones 512. The bone conduction devices 510 may generate and provide bone conduction data and the external microphones 512 may generate and provide external audio data to a non-verbal signal processing system of the system 500. The non-verbal signal processing system may then detect non-verbal commands based at least in part on the bone conduction data, the external audio data, the audio output data, the visual data, and the gaze data. In the current example, the bone conduction devices 512 may be positioned along a nose pad of the glasses 502 and along an interior surface (e.g., user facing surface) of each temple of the frame 508 at a position at which the temple contacts the head of the user.

Figure 6:
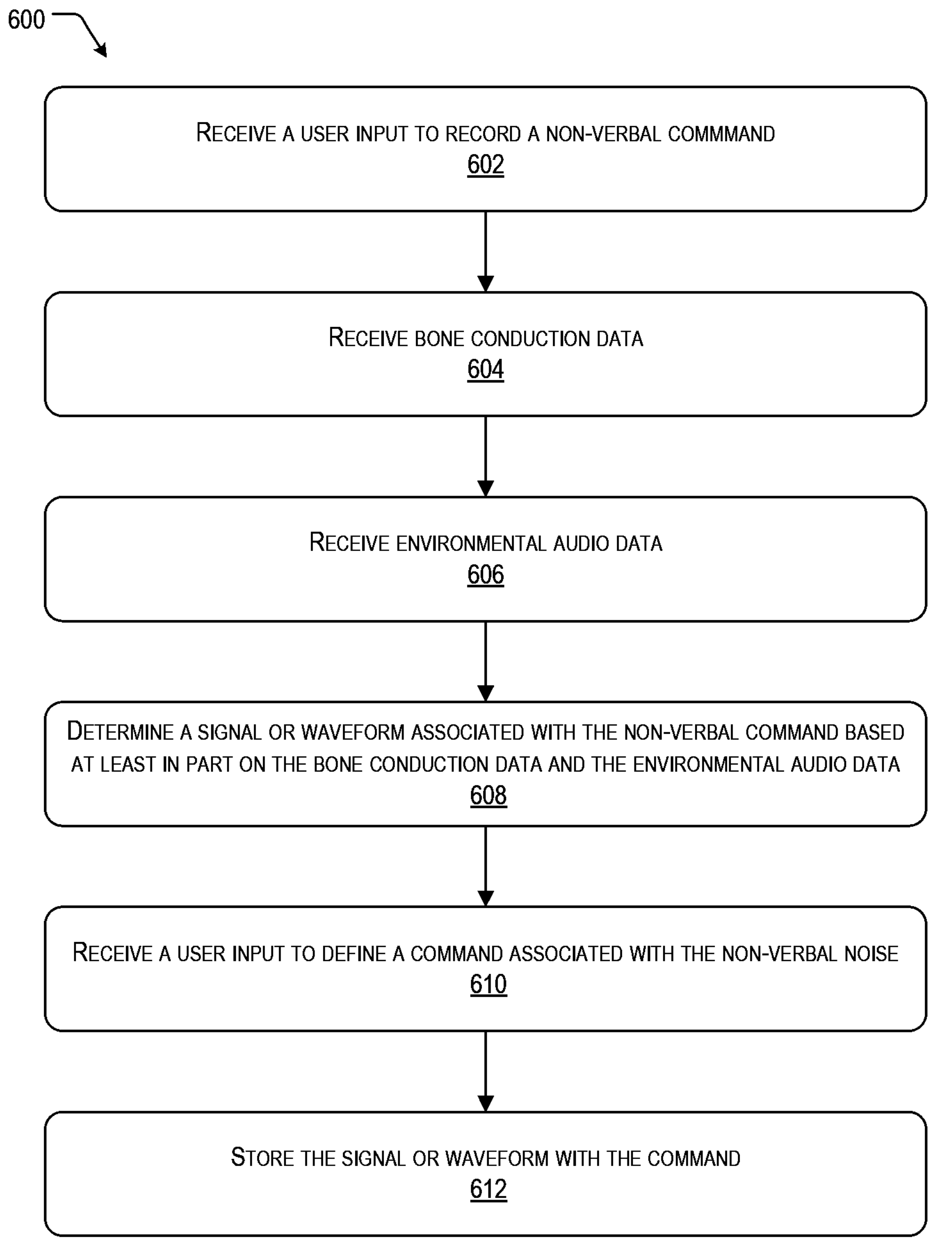
FIG. 6 is a flowchart of an example process for generating non-verbal commands, in accordance with one or more examples.
Figure 7:
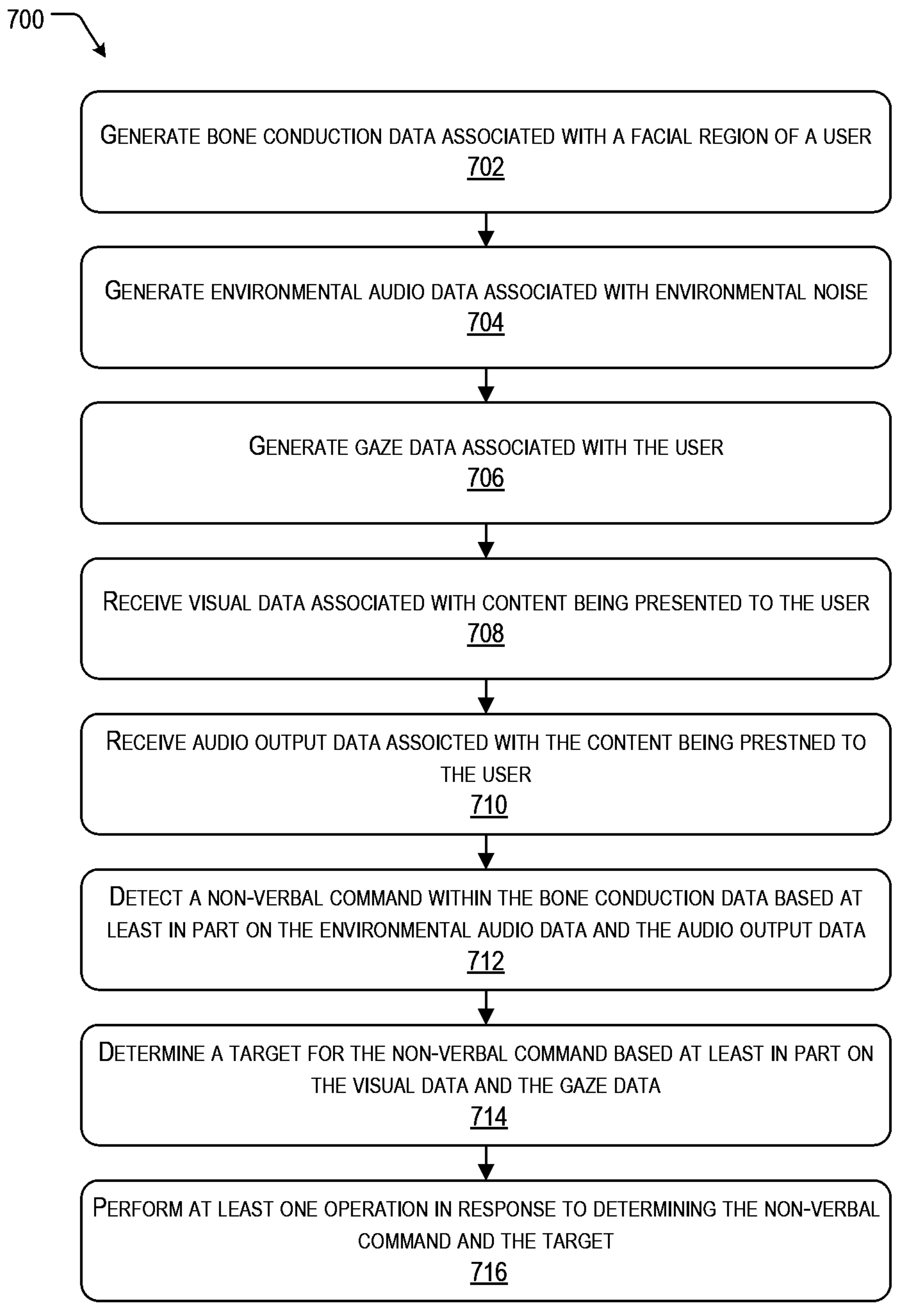
FIG. 7 is a flowchart of an example process for detecting non-verbal commands, in accordance with one or more examples.

FIGS. 6 and 7 are flow diagrams illustrating example processes associated with detecting and responding to non-verbal commands according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the FIGS. 1-5.

FIG. 6 is a flowchart of an example process 600 for generating non-verbal commands, in accordance with one or more examples. The process 600 may be performed by components of the system, discussed above with respect to FIGS. 1-5. In some implementations, the non-verbal commands may be tailored or customized for the individual user. For instance, the detectable waveform associated with the bone conduction data may be affected by specific voice, bone, cheek, teeth, as well as other facial structure of the user such that the non-verbal signal processing system is trained to detect the non-verbal command of the individual users.

At 602, the system may receive a user input to record a non-verbal command. For example, the signal may be a user input via a hand-held control device for the headset system, a verbal command, gesture, or other type of natural language input, as well as an input via an auxiliary device, such as a wireless coupled electronic device.

At 604, the system may receive or capture bone conduction data. for instance, the system may cause a bone conduction sensor positioned within the ear canal of the user, as discussed above, to capture bone conduction data while the user is instructed, such as via display components or an audio output to generate or otherwise produce the non-verbal command. In some cases, the system may request the user generate the non-verbal command over a specific period of time, a predetermined number of times, or until the bone conduction data meets or exceeds a quality threshold. For example, in one particular example, a first user input demarking a start position of the vibrational noise associated with the non-verbal command and a second user input demarking an end position of the vibrational noise associated with the non-verbal command. The system may then process the bone conduction data between the start position and the end position.

At 606, the system may receive environmental audio data. The environmental audio data may include noise from the environment about the user and be used to assist in isolating or defining the waveform associated with the non-verbal command. In some implementations, the system may cause an external microphone to capture the environmental audio data while the bone conduction sensor is generating the bone conduction data associated with the non-verbal command.

At 608, the system may determine a signal or waveform associated with the non-verbal command based at least in part on the bone conduction data and the environmental audio data. For example, the system may average or otherwise define the signal or waveform from the remaining bone conduction data after the environmental audio data has been filtered.

At 610, the system may receive a user input to define a command associated with the non-verbal noise. For example, the user may provide an input to define the command, such as a command traditionally associated with a mouse (e.g., a right click, left click, long click, short click, double tap, scroll left, right, up, or down, as well as any other type of command associated with a mouse). In some cases, the command may be associated with a traditional keyboard command (e.g., enter, alt, control, shift, and the like). In other case, the cases the command may be associated with command of various game controllers, joy sticks, and the like. In still some specific examples, the command may be associated with a particular content, application, or the like.

At 612, the system may store the signal or waveform with the command. The system may then utilize the stored signal or waveform to detect future user inputs or commands and, in response to a detection, to cause the associated command to be executed by the system.

FIG. 7 is a flowchart of an example process 700 for detecting a non-verbal command, in accordance with one or more examples. As discussed above, in some circumstances and situations, such as when a user is actively engaged in conversation, verbal commands or other audio-based user inputs may be problematic. The spoken verbal commands may disrupt the flow of conversation and/or allow the other participants of the conversation to overhear the voice commands. As such, the system discussed herein, may be configured to detect and respond to non-verbal commands of the user.

At 702, the system may generate bone conduction data associated with a facial region of the user. For example, the system may comprise one or more bone conduction sensors positioned within or in contact with the ear canal of the user. The bone conduction sensor positioned in this manner may generate bone conduction data associated with non-verbal noises (such as hums, grunts, growls, and the like) generated by the user as well as teeth, lip or tongue taps or clicks. In some cases, the bone conduction sensor positioned in this manner may generate bone conduction data associated with user's tapping, rubbing, or otherwise touching their facial region with, for instance, a hand.

At 704, the system may generate environmental audio data associated with environmental noise. For example, an external microphone may be positioned along an exterior surface of the earbud and/or headset device to capture noise present in the environment surrounding the user.

At 706, the system may generate gaze data associated with the user. For example, the headset and/or display components of the system may be equipped with an eye-tracking assembly to generate the gaze data representative of the gaze, target region, and/or target object of the user's attention. The eye-tracking device may comprise one or more infrared illuminators to illuminate a facial region associated with the eyes of the user. The eye-tracking device may then capture image data of the eyes and determine the gaze data based on reflections between the cornea and pupils.

At 708, the system may receive visual data associated with content being presented to the user. For example, the system may provide the visual data to both the display or display components and to the non-verbal command system, as discussed herein. The visual data may include VR content, MR content, AR content, and the like.

At 710, the system may receive audio output data associated with the content being presented to the user. For example, as discussed above, the system may include an earbud that has a driver or speaker that may output sound associated with the content being presented on the display. In some cases, the audio output data may be stereo and/or directional such that one or more drivers or speakers associated with each ear of the user may produce the directional sound. In these cases, the non-verbal command system may receive audio output data associated with each ear of the user and/or each driver of the system.

At 712, the system may detect a non-verbal command within the bone conduction data based at least in part on the environmental audio data and the audio output data. For example, the system may filter the bone conduction data using the environmental audio data and the audio output data to reduce the likelihood of a false positive or false negative with respect to detecting a signal or waveform associated with the non-verbal command. For example, when a user is running or the surrounding environment has high low frequency noise content, then the impact of running or the low frequency noise may cause vibrations with respect to the body and/or face of the user. The impacts and/or low frequency noise may then be filtered from the bone conduction data using the environmental audio data prior to detecting the non-verbal command.

At 714, the system may determine a target for the non-verbal command based at least in part on the visual data and the gaze data. For example, the system may determine, based on the specific non-verbal command detected with respect to 712, that an operation associated with the non-verbal command is directed at a target object being presented on a display (e.g., a mouse click on an icon).

At 716, the system may perform at least one operation in response to determining the non-verbal command and the target. For instance, the system may execute one or more operations associated with the detected non-verbal command on the target, such as selecting the target, displaying one or more menus associated with the target, scrolling or rotating the target, or otherwise interacting with the target. In other cases, the operations may be associated with the presentation of the content to the user. For instance, the operations may include, but not limited to, pausing the presentation of the content, adjusting the volume, transitioning to another location or pose within the content, rewinding or undoing an operation associated with the content, and the like.

Figure 8:
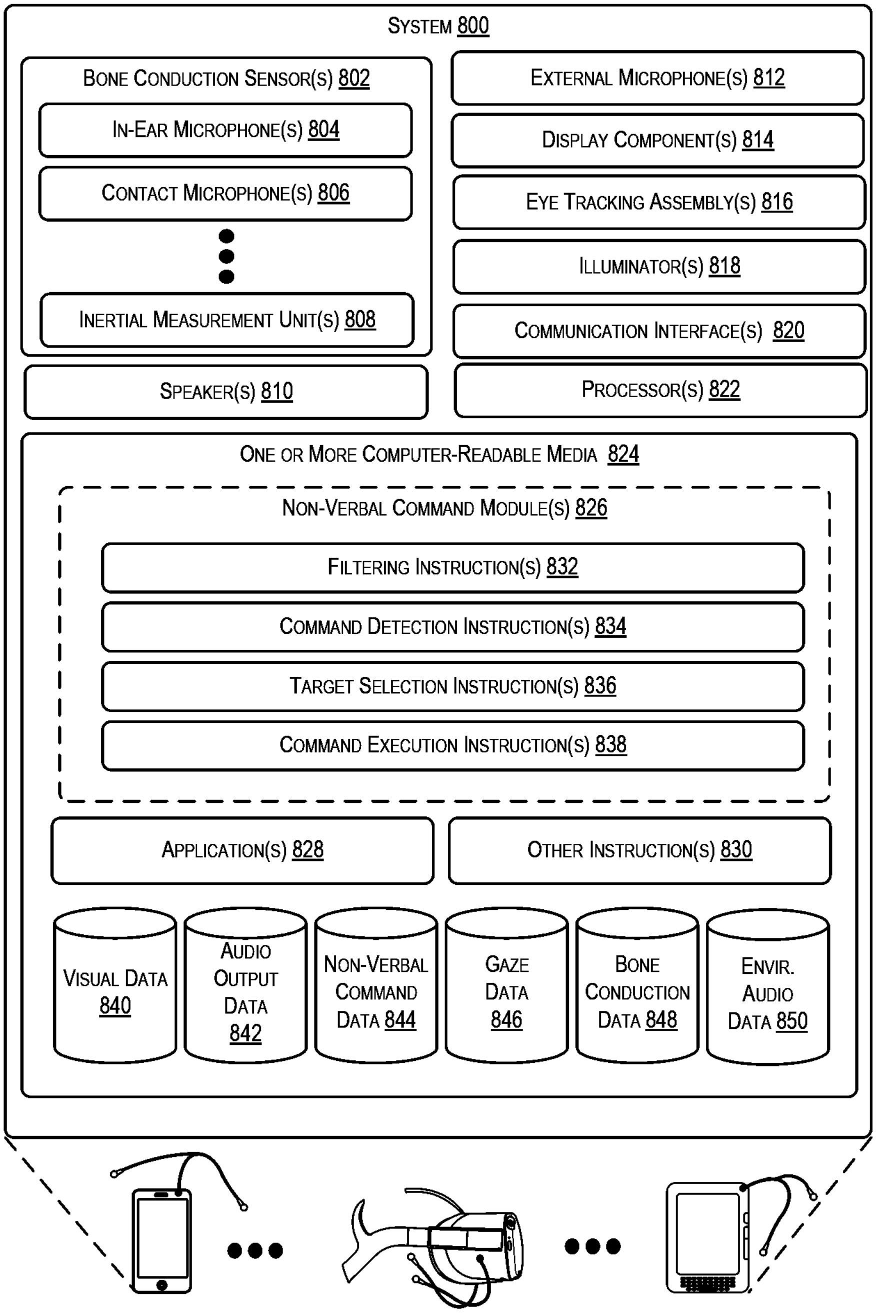
FIG. 8 is an example system for implementing non-verbal commands, in accordance with one or more examples.

FIG. 8 is an example system 800 for implementing non-verbal commands, in accordance with one or more examples. As discussed above, the system 800 may be configured to provide or immerse a user in a VR, MR, AR scene using a headset device and/or one or more earbuds. For example, the headset may correspond to a HMD, near eye display, or other headset system for providing visual content, such as the VR, MR, or AR scene, to the user. The earbuds may include one or more in-ear or over-the-ear systems for providing audio output data to the user as sound. While the system 800, discussed herein, is discussed with respect to a headset system, it should be understood that in other examples, the system 800 may comprise traditional display systems, such as monitors, tablets, notebooks, smartphones, and the like together with communicatively coupled earbuds or other audio systems, as shown in FIG. 4.

In the current example, the earbud of the system 800 may include a bone conduction sensor 802. The bone conduction sensor 802 may further comprise one or more in-ear microphones 804, one or more contact microphones 806, one or more IMUs 808, as well as other devices configured to detect vibrations associated with a facial region of the user. In some cases, the system 800 may comprise one or more in-ear microphones 804 in combination with one or more contact microphones 806 or IMUs 808. In this example, the in-ear microphones 804 may be configured to generate audio data associated with the ear canal of the user and the contact microphones 806 and/or IMUs 808 may be configured to generate bone conduction data associated with the facial region of the user.

In some implementations, the in-ear microphones 804 may be positioned within the ear canal of the user along a surface of the earbud, and the contact microphones 806 and/or IMUs 808 may be positioned within and in contact with the ear canal of the user. For instance, the contact microphones 806 and/or IMUs 808 may be positioned in contact with the surface of the ear canal of the user. In some cases, both the audio data generated by the in-ear microphone and the bone conduction data generated by the contact microphones 806 and/or IMUs 808 may be used by the system 800 to detect the non-verbal commands issued by the user.

In the current example, the earbud of the system 800 may also include one or more speakers 810 and/or one or more external microphones 812. The speakers 810 may cause sound associated with content being delivered to the user to be output into the ear canal of the user. The external microphones 812 may be configured to generate audio data associated with environmental noise. In some implementations, the audio data associated with the ear canal of the user generated by the in-ear microphones 806 may be used in combination with the audio data associated with environmental noise generated by the external microphones 812 to provide noise cancelation for the user.

As discussed above, the system 800 may also include a headset or other display system. In the current example, the headset of the system 800 may comprise one or more display components 814 to present visual content to the user as well as or more eye-tracking assemblies 816 and one or more illuminators 818 for generating gaze data associated with the user. For example, the eye-tracking assemblies 816 may comprise one or more cameras, infrared image devices, DCA, and the like to capture image data associated with the eyes of the user. The illuminators 818 may include one or more infrared illuminator that may produce structured light (e.g., dot pattern, bars, etc.) in the infrared, infrared flash for time-of-flight, and so forth, such that the eye-tracking devices 816 may then determine gaze data associated with the eyes of the user based on, for instance, infrared reflections between the cornea and pupils.

The system 800 may also include one or more communication interfaces 820 configured to facilitate communication between one or more networks, one or more cloud-based system, and/or one or more physical objects, such as hand-held controller. The communication interfaces 820 may also facilitate communication between one or more wireless access points, a master device, and/or one or more other computing devices as part of an ad-hoc or home network system. The communication interfaces 820 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 820 may be configured to wirelessly and communicatively couple the earbuds to the headset device.

The system 800 may also include one or more processors 822, such as at least one or more access components, control logic circuits, central processing units, or processors, as well as one or more computer-readable media 824 to perform the function associated with the virtual environment. Additionally, each of the processors 822 may itself comprise one or more processors or processing cores.

Depending on the configuration, the computer-readable media 824 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 822.

Several modules such as instruction, data stores, and so forth may be stored within the computer-readable media 824 and configured to execute on the processors 822. For example, as illustrated, the computer-readable media 824 may store a non-verbal command module 826, various applications 828, as well as other instructions 830, such as an operating system. In some cases, the non-verbal command module 826 may include filtering instructions 832, command detection instructions 834, target selection instructions 836, command execution instructions 838, and the like. The computer-readable media 824 may also store data usable by the various applications 828 and instructions 832-838. The stored data may include visual data 840, audio output data 842, non-verbal command data 844, gaze data 846, bone conduction data 848, environmental audio data 850, and the like.

The filtering instructions 832 may be configured to receive the audio output data 842 associated with content being presented to the user, such as via one of the applications 828, the speakers 810, and/or the display components 814. The filtering instructions 832 may also receive environmental audio data 850 representative of the noise in the environment surrounding the user and bone conduction data 848 associated with vibrations of a facial region of the user. In the illustrated example, the filtering instructions 832 may filter the bone conduction data 848 based at least in part on the audio output data 842 and the environmental audio data 850.

The command detection instructions 834 may be configured to detect a stored non-verbal command associated with the non-verbal command data 844 based on the filtered bone conduction data output by the filtering instructions 832. For example, the command detection instructions 834 may be configured to compare the signal or waveform of the filtered bone conduction data to stored signals and/or waveforms representative of individual non-verbal commands. In some cases, the command detection instructions 834 may compare maximums and minimums of the filtered bone conduction data within multiple frequency bands to the signals and/or waveforms representative of individual non-verbal commands. A match may then be determined if greater than a number of maximums and/or minimums of the two signals are within a threshold distance of each other.

The target selection instructions 836 may be configured to identify a target for the non-verbal command within the content being presented to the user. For example, the target selection instructions 836 may receive the gaze data 846 from the eye-tracking assemblies 816 as well as the visual data 840 being presented to the user by the display components 814. In some examples, the target may be an object, region, or feature of the visual data or content presented on the display.

The command execution instructions 838 may cause the system 800, such as the processors 822, to perform or execute one or more operations associated with the detected non-verbal command to the target. For example, the command execution instructions 838 may adjust a setting, select the target, open a menu associated with the target, and the like.

The foregoing description has been presented for illustration; it is not intended to be exhaustive or to limit the scope of the disclosure to the precise forms disclosed. Persons skilled in the relevant art can appreciate that many modifications and variations are possible considering the above disclosure.

Some portions of this description describe the examples in terms of algorithms and symbolic representations of operations on information. These algorithmic descriptions and representations may be used by those skilled in the data processing arts to convey the substance of their work effectively to others skilled in the art. These operations, while described functionally, computationally, or logically, are understood to be implemented by computer programs or equivalent electrical circuits, microcode, or the like. The described operations and their associated components may be embodied in software, firmware, hardware, or any combinations thereof.

Any of the steps, operations, or processes described herein may be performed or implemented with one or more hardware or software modules, alone or in combination with other devices. In examples, a software module is implemented with a computer program product comprising a computer-readable medium containing computer program code, which can be executed by a computer processor for performing any or all the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An electronic device comprising:

a bone conduction sensor to generate bone conduction data, the bone conduction data associated with vibrations propagating via a facial structure of a user;

an eye-tracking assembly to generate gaze data associated with the user;

a display;

one or more processors; and one or more computer-readable media storing instructions that, when executed by the one or more processors, cause the one or more processors to perform operations comprising:

receiving, from the bone conduction sensor, the bone conduction data;

receiving environmental audio data, the environmental audio data representative of noise in an environment surrounding the electronic device;

receiving audio output data, the audio output data associated with content presented to the user by the display;

filtering the bone conduction data based at least in part on the environmental audio data and the audio output data;

associating filtered bone conduction data with a first non-verbal command of a plurality of non-verbal commands based at least in part on a comparison of the filtered bone conduction data with a plurality of stored user-generated waveforms, a first user-defined stored waveform of the plurality of stored user-generated waveforms corresponding to the first non-verbal command;

receiving, from the eye-tracking assembly, the gaze data;

receiving visual data associated with the content presented to the user by the display;

determining a target object for the first non-verbal command based at least in part on the gaze data and the visual data, the visual data including a representation of the target object; and causing an operation to execute with respect to the target object, the operation associated with the first non-verbal command.

2. The electronic device of claim 1, wherein the bone conduction sensor is positioned within an ear canal of the user during use.

3. The electronic device of claim 2, wherein the bone conduction sensor is in contact with the ear canal.

4. The electronic device of claim 1, wherein the bone conduction sensor is coupled to an arm associated with an earbud of the electronic device.

5. The electronic device of claim 1, wherein the eye-tracking assembly comprises at least one infrared image device and at least one infrared illuminator.

6. The electronic device of claim 1, further comprising:

an external microphone to generate the environmental audio data.

7. The electronic device of claim 6, further comprising:

an in-ear microphone to generate in-ear audio data, the in-ear audio data representative of noise in an ear canal of the user, wherein:

the bone conduction sensor is a contact microphone; and the operations further comprise:

filtering the bone conduction data based at least in part on the in-ear audio data; and providing noise cancellation based at least in part on the environmental audio data and the in-ear audio data.

8. The electronic device of claim 1, wherein the operations further comprise:

detecting the first non-verbal command within the bone conduction data by determining that at least a portion of the filtered bone conduction data matches a waveform associated with a non-verbal command.

9. The electronic device of claim 1, wherein the operations further comprise:

receiving, from the bone conduction sensor, additional bone conduction data;

detecting a second non-verbal command from the plurality of non-verbal commands within the additional bone conduction data based at least in part on a second user defined stored waveform from the plurality of stored user-generated waveforms, the second user-defined stored waveform different than the first user-defined stored waveform;

receiving, from the eye-tracking assembly, additional gaze data;

determining a second target for the operation associated with the first second non-verbal command based at least in part on the second additional gaze data and additional visual data, the additional visual data being presented on the display; and causing a second operation to execute with respect to the second target, the second operation associated with the second non-verbal command corresponding to the second user-defined stored waveform.

10. The electronic device of claim 9, further comprising:

receiving, from an external microphone, the environmental audio data; and filtering the additional bone conduction data based at least in part on the environmental audio data.

11. The electronic device of claim 1, where the operations further comprise:

receiving, from the bone conduction sensor, additional bone conduction data; and responsive to determining that the additional bone conduction data does not correspond to one of the plurality of stored user-generated waveforms, utilizing the additional bone conduction data to cancel noise in the environment surrounding the electronic device.

12. The electronic device of claim 1, wherein associating the bone conduction data with the first non-verbal command of the plurality of non-verbal commands is based at least in part on an active application on the electronic device, the active application associated with the visual data.

13. One or more non-transitory computer-readable media storing instructions that, when executed by one or more processors, cause the one or more processors to perform operations comprising:

receiving, from a bone conduction sensor, bone conduction data;

receiving environmental audio data, the environmental audio data representative of noise in an environment surrounding an electronic device;

receiving audio output data, the audio output data associated with content presented to a user by a display;

filtering the bone conduction data based at least in part on the environmental audio data and the audio output data;

associating the filtered bone conduction data with a first non-verbal command of a plurality of non-verbal commands based at least in part on a comparison of the filtered bone conduction data with a plurality of stored user-generated waveforms, a first user-defined stored waveform of the plurality of stored user-generated waveforms corresponding to the first non-verbal command;

receiving, from an eye-tracking assembly, gaze data;

receiving visual data associated with the content presented to the user by the display;

determining a target object for the first non-verbal command based at least in part on the gaze data and the visual data, the visual data including a representation of the target object; and causing an operation to execute based at least in part on the target object, the operation associated with the first non-verbal command.

14. The one or more non-transitory computer-readable media of claim 13, the operations further comprising:

receiving, from an external microphone, the environmental audio data.

15. The one or more non-transitory computer-readable media of claim 13, the operations further comprising:

receiving, from the bone conduction sensor, additional bone conduction data;

detecting a second non-verbal command from the plurality of non-verbal commands within the additional bone conduction data based at least in part on a second user-defined stored waveform from the plurality of stored user-generated waveforms, the second user-defined stored waveform different than the first user-defined stored waveform;

receiving, from the eye-tracking assembly, additional gaze data;

determining a second target for the second non-verbal command based at least in part on the additional gaze data and additional visual data, the additional visual data being presented on the display; and causing a second operation to execute based at least in part on the second target, the second operation associated with the second non-verbal command corresponding to the second user defined stored waveform.

16. The one or more non-transitory computer-readable media of claim 13, the operations further comprising:

detecting the first non-verbal command from the plurality of non-verbal commands within the filtered bone conduction data based at least in part on the first user-defined stored waveform.

17. The one or more non-transitory computer-readable media of claim 13, wherein associating the filtered bone conduction data with the first non-verbal command of the plurality of non-verbal commands is based at least in part on an active application on the electronic device, the active application associated with the visual data.

18. A method comprising:

receiving, from a bone conduction sensor, bone conduction data;

receiving environmental audio data, the environmental audio data representative of noise in an environment surrounding an electronic device;

receiving audio output data, the audio output data associated with content presented to a user by a display;

filtering the bone conduction data based at least in part on the environmental audio data and the audio output data;

associating filtered bone conduction data with a first non-verbal command of a plurality of non-verbal commands based at least in part on a comparison of the filtered bone conduction data with a plurality of stored user-generated waveforms, a first user-defined stored waveform of the plurality of stored user-generated waveforms corresponding to the first non-verbal command;

receiving, from an eye-tracking assembly, gaze data;

receiving visual data associated with the content presented to the user by the display;

determining a target object for the first non-verbal command based at least in part on the gaze data and the visual data; and causing an operation to execute with respect to the target object, the operation associated with the first non-verbal command.

19. The method of claim 18, further comprising:

receiving, from the bone conduction sensor, additional bone conduction data;

detecting a second non-verbal command from the plurality of non-verbal commands within the additional bone conduction data based at least in part on a second user-defined stored waveform from the plurality of stored user-generated waveforms, the second user-defined stored waveform different than the first user-defined stored waveform;

receiving, from the eye-tracking assembly, additional gaze data;

determining a second target for the second non-verbal command based at least in part on the additional gaze data and additional visual data, the additional visual data being presented on the display; and causing a second operation to execute based at least in part on the second target, the operation associated with the second non-verbal command corresponding to the second user-defined stored waveform.

20. The method of claim 18, wherein associating the bone conduction data with the first non-verbal command of the plurality of non-verbal commands is based at least in part on an active application on the electronic device, the active application associated with the visual data.

* * * * *